2,354,966

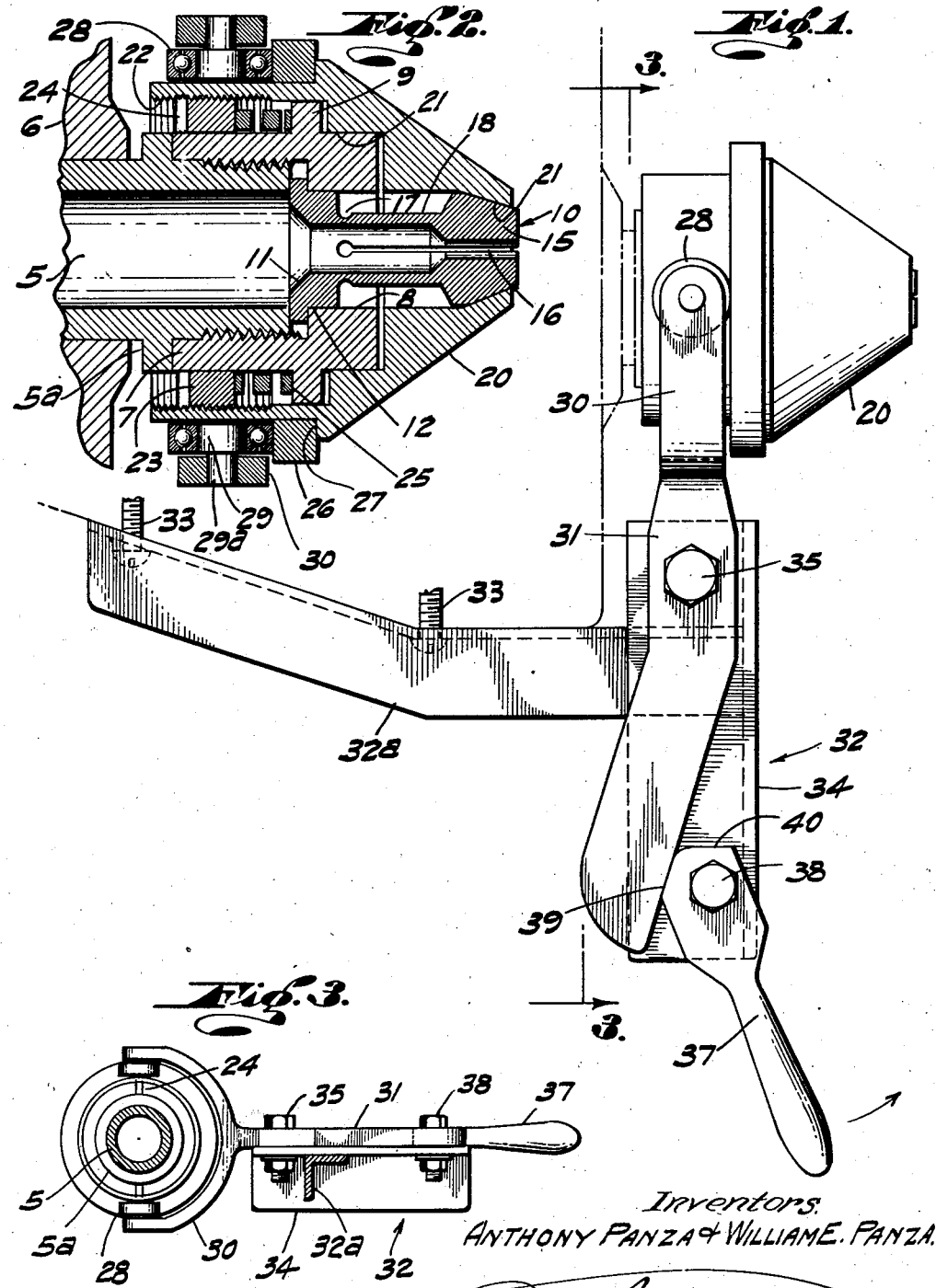
Aug. 1, 1944. A. PANZA ET AL 2,354,966
COLLET ATTACHMENT FOR LATHES
Filed Oct. 28, 1942
Inventors:
ANTHONY PANZA & WILLIAM E. PANZA Patented Aug. 1, 1944

UNITED STATES PATENT OFFICE 2,354,966

COLLET ATTACHMENT FOR LATHES

Anthony Panza and William E. Panza, Los Angeles, Calif.

Application October 28, 1942, Serial No. 463,656

4 Claims. (Cl. 279—50)

This invention relates to a collet chuck attachment.

More specifically speaking, the invention relates to a collet attachment for lathes which is operable to grip or release a bar or other article extending through the headstock of the lathe and being operated upon. With our improved attachment upon releasing the grip on the work the collet attachment is permitted to rotate continuously, thereby avoiding the necessity of stopping the rotation of the collet chuck to remove one piece of work and substitute another, or to adjust to a different position a piece of work which is being gripped by the rotating chuck.

Among the objects of the invention are:

To improve upon devices of the above stated kind in regard to reducing the number of operating parts, providing a more quickly operable lever controlled means for gripping and releasing the work, and also to improve upon prior structures in regard to simplicity, and durability of structure and ease of operation.

Another object of the invention is to provide improved means for attaching to lathes now on the market without altering their structures, a collet operating device for gripping and releasing the work without stopping the rotation of the chuck.

Yet another object of the invention relates to the provision, as a new article of manufacture, of a resilient collet to take the place of a turret lathe headstock and peculiarly well adapted to be contracted to grip, and expanded to release, a piece of work.

Other objects, advantages and features of invention will hereinafter appear.

Referring to the accompanying drawing, which illustrates what is at present deemed to be a preferred embodiment of the invention, Fig. 1 is a plan view of the structures which pertain to the invention, a conventional headstock and lathe spindle with which these are associated, being outlined in broken lines.

Fig. 2 is a horizontal section, the axis of the lathe lying in the plane of section.

Fig. 1 is on a somewhat smaller scale than Fig. 2, and Fig. 3 is on a still smaller scale.

Fig. 3 is a vertical section on line 3—3 of Fig. 1.

Referring in detail to the drawing, onto a conventional tubular lathe headstock spindle 5 carried by the headstock 6, is screwed a spindle attachment consisting of an internally threaded annular member 7 having at its outer end a thick internal annular lip 8 which is rectangular in cross section, and an external peripheral flange 9, the latter being located in an inwardly spaced relation to the outer end of said annular member 7. The lathe spindle has an external peripheral flange 5a to limit the onscrewing of the annular member 7.

A work-gripping collet 10 is clamped axially against the outer end of the headstock spindle 5 by means of the aforesaid annular member 7, said collet having a diametrically enlarged base 11 having around it an external angular recess 12 into which the rectangular lip 8 fits so as not only to clamp the collet against the end of the lathe spindle but to con-center and stabilize said collet against lateral deflection. At its outer end said collet has a forwardly tapered head 15 which is diametrically split at 16, the split extending inwardly throughout the greater portion of the length of the collet. A circumferential, half round groove 17 surrounds the collet opposite to the inner end of its split 16, said groove being located at the inner end of the diametrically reduced tubular part 18 of the collet. Said groove 17 reduces the thickness of the collet wall and thus adds to the springiness thereof. Different parts of the axial passage of the collet vary in diameter, the part of said passage which leads through the head of the collet being of the least diameter.

An external clamping sleeve 20 surrounds the collet 10 and annular member 7. Said clamping sleeve 20 is forwardly tapered and furnished at its outer end with an internal bevel 21 which cooperates with the tapered outer surface of the head 15 of the collet. Said clamping sleeve 20 is of a rearwardly expanded, internally stepped character thus providing an internal angular annular shoulder 21 and farther back an internally threaded tubular portion 22 into which screws an externally threaded collar 23.

Said collar 23 fits loosely around the annular member or sleeve 7 and, as viewed in Fig. 2, has a pair of diametrically opposite recesses 24 cut into its left end to receive a suitable wrench. The opposite or front end of said collar abuts against a stocky coil spring 25, which in turn acts against the rear side of the flange 9 of the annular member 7, said spring therefore causing the internal bevel 21 of the front part of the clamping sleeve 20 firmly to press against the beveled surface of the collet head 15 except when its pressure thereupon is relaxed by the means presently to be described. The workman can accurately gauge the amount of this pressure by screwing in the ring 23 the proper distance. The threaded portion 22 of the member 20 is extended rearwardly a sufficient distance to enable the workman to screw the collar into at least a flush relation to said portion 20 before the spring 25 begins to be compressed, thus facilitating putting said collar into its operative position.

Around the sleeve portion 22 of the clamping member 20 is snugly fitted a steel bearing ring 26 the outer side of which abuts against an annular shoulder 27 provided therefor around said member 20, the opposite side of said bearing ring being engaged at diametrically opposite points by the ball bearing structures 28 surrounding the circular heads 29 furnished with stub shafts 29a fixed to the yoke arms 30 of the lever 31. Said lever is mounted upon a bracket 32 having an angle-iron attaching arm 32a which, by means of the usual headstock screws 33 is secured to the frame of the lathe.

Said bracket 32 is shown made in two pieces which are welded to each other, its body portion 34, as well as its arm 32a, being of a rightangular character, and the aforesaid yoke-carrying lever 31 is pivotally attached at about its mid-length to the bracket body 34 by means of a pivot bolt 35. Said lever 31 is pivoted to one of the flanges of the bracket body 34 at a point located in the inner portion of said bracket body, that is to say, the part thereof which is nearest to the clamping member 20. To the outer part of said bracket body is pivoted a manually operable cam lever 37 by means of a pivot bolt 38 which is located close to the cam faces 39 and 40 of this lever.

When the cam lever 37 is positioned as shown in Fig. 1 with its cam face 39 in contact with the main lever 31 the parts are maintained in the position shown in Fig. 2 wherein the internal bevel 21 of the clamping member 20 allows the split collet head 15 to expand sufficiently to release the rod or other work being operated upon; but when the cam lever is swung as indicated by the arrow adjacent thereto in Fig. 1 to a position wherein its cam face 40 (nearest to its pivot) engages the lever 31, the ball bearing structure carried by the yoke 30 moves rearwardly toward the left a short distance, being caused to do so by the action of the spring 25 upon the intervening structures, thus moving the clamping member 20 rearwardly far enough to contact the collet head 15 to the extent necessary to grip the work. Owing to the flat character of the cam faces 39 and 40 of the lever 37 and to the fact that these cam faces cooperate with a straight edge or face of the lever 31 while the spring impelled lever 31 maintains a steady pressure upon the cam faces, the two levers are dependably maintained in their adjusted relation to each other whichever of the two cam faces of the cam lever contacts with the main lever 31.

Without stopping the rotation of the lathe spindle the device may be rapidly operated both to release the hold of the collet upon the work and to renew its grip thereupon after the work has been readjusted or a new piece of work inserted. Also the necessity of resetting clutch jaws is obviated.

In case a rod is being cut into sections by the lathe to which the device is attached, such rod may extend axially into the spindle of the lathe for a considerable distance and be rapidly fed forward step by step to a cutting tool without stopping the rotation of the lathe.

It is only necessary to move the cam sleeve 20 forward enough to allow the radius of the collet head 15 to increase .005 of an inch to release a rod or other piece of work being gripped by said collet.

The illustrated embodiment of the invention is designed for attachment to the headstock of an Atlas lathe, but it lies within the skill of workmen in the art to which the invention pertains to adopt it for use in combination with other kinds of lathes.

It is to be understood that, in order to adapt the device for operating upon different rods or other pieces of work of different diameters a number of collets will be provided each being of the same general design but varying in their size.

It should be understood that the present disclosure is for the purpose of illustration only and that this invention includes all modifications and equivalents which fall within the scope of the subject matter claimed.

What is claimed is:

1. In a collet attachment for lathes, a resilient collet having a tubular body and a diametrically expansible head which is tapered away from said body, means for securing said body to the outer end portion of a lathe spindle in axial alinement therewith, a clamping sleeve mounted upon said securing means in a surrounding relation thereto, said sleeve having an internally tapered portion which is in a surrounding contacting relation to the aforesaid tapered portion of said head, said sleeve having a slight axial movement in relation to said collet, spring means carried by the aforesaid securing means in a position to urge said sleeve in a direction to cause its internally tapered portion to maintain the collet in a contracted condition to grip work, means to move said sleeve in opposition to said spring, thereby to allow said collet to expand and relax its grip upon the work, said means for moving said sleeve including a main lever pivotally supported between its ends with one of its ends positioned to act upon said sleeve, and a manually operable cam lever positioned to act upon the opposite end portion of said main lever, said cam lever having a plurality of flat cam faces which dependably maintain it in various adjusted positions.

2. In a collet attachment for lathes, a resilient collet having a tubular body and a diametrically expansible head which is tapered away from said body, means for securing said body to the outer end portion of a lathe spindle in axial alinement therewith, a clamping sleeve mounted upon said securing means in a surrounding relation thereto, said sleeve having an internally tapered portion which is in a surrounding contacting relation to the aforesaid tapered portion of said head, said sleeve having a slight axial movement in relation to said collet, said securing means being annular and having around it an external circumferential flange, a ring loosely surrounding said securing means, said sleeve having an internally threaded portion into which said ring is screwed, a compression spring coiled around said securing means in a position to urge apart said flange thereof and said ring, thereby to urge said sleeve in a direction to cause its internally tapered portion to maintain the collet in a contracted condition to grip work, and means to move said sleeve in opposition to said spring, thereby to allow said collet to expand and relax its grip upon the work.

3. In a collet attachment for lathes, a resilient collet having a tubular body and a diametrically expansible head which is tapered away from said body, means for securing said body to the outer end portion of a lathe spindle in axial alinement therewith, a clamping sleeve mounted upon said securing means in a surrounding relation thereto, said sleeve having an internally tapered portion which is in a surrounding contacting relation to the aforesaid tapered portion of said head, said sleeve having a slight axial movement in relation to said collet, said securing means being annular and having around it an external circumferential flange, means loosely surrounding and operatively connected to said securing means, yieldable means acting between the latter means and the flange of said securing means, thereby to urge said sleeve in a direction to cause its internally tapered portion to maintain the collet in a contracted condition to grip work, and means to move said sleeve in opposition to said yieldable means, thereby to allow said collet to expand and relax its grip upon the work.

4. In a collet attachment for lathes, a collet having a tubular body furnished at its outer end with an expansible and contractible head which is outwardly tapered, there being an external angular recess extending around the inner end portion of said body, thereby producing an annular flange around the inner end thereof, an annular member having an internally threaded portion to screw onto the headstock spindle of the lathe, said annular member having an internal annular lip along which extends an angular corner portion which fits into said angular recess and thereby clamps said collet against the outer end of the headstock spindle in axial alinement therewith and at the same time by lateral contact therewith stabilizes said collet against being deflected from said axial alinement, a clamping sleeve mounted upon said annular member in a surrounding relation thereto, said sleeve having an internally tapered portion which is in a surrounding contacting relation to the aforesaid tapered portion of said head, said sleeve having a slight axial movement in relation to said collet, spring means carried by the aforesaid securing means in a position to urge said sleeve in a direction to cause its internally tapered portion to maintain the collet in a contracted condition to grip work, and means to move said sleeve in opposition to said spring, thereby to allow said collet to expand and relax its grip upon the work.

ANTHONY PANZA.
WILLIAM E. PANZA.